US011008464B2

(12) United States Patent
Cocquet et al.

(10) Patent No.: US 11,008,464 B2
(45) Date of Patent: May 18, 2021

(54) COPOLYMER FOAM WITH POLYAMIDE BLOCKS AND POLYETHER BLOCKS

(71) Applicant: Arkema France, Colombes (FR)

(72) Inventors: Clio Cocquet, Bernay (FR); Quentin Pineau, Evreux (FR); Karine Loyen, Pont-Audemer (FR); François Fernagut, Le Val David (FR); Helena Cheminet, Saint Martin du Tilleul (FR)

(73) Assignee: ARKEMA FRANCE, Colombes (FR)

( * ) Notice: Subject to any disclaimer, the term of this patent is extended or adjusted under 35 U.S.C. 154(b) by 171 days.

(21) Appl. No.: 16/071,351

(22) PCT Filed: Jan. 27, 2017

(86) PCT No.: PCT/FR2017/050187
§ 371 (c)(1),
(2) Date: Jul. 19, 2018

(87) PCT Pub. No.: WO2017/129913
PCT Pub. Date: Aug. 3, 2017

(65) Prior Publication Data
US 2019/0071570 A1 Mar. 7, 2019

(30) Foreign Application Priority Data

Jan. 29, 2016 (FR) ...................................... 1650719

(51) Int. Cl.
C08L 87/00 (2006.01)
C08J 9/00 (2006.01)
C08J 9/12 (2006.01)
C08J 9/14 (2006.01)
C08G 69/40 (2006.01)

(52) U.S. Cl.
CPC ............ C08L 87/005 (2013.01); C08G 69/40 (2013.01); C08J 9/0061 (2013.01); C08J 9/122 (2013.01); C08J 9/141 (2013.01); C08J 9/144 (2013.01); C08J 9/145 (2013.01); C08J 9/146 (2013.01); C08J 9/147 (2013.01); C08G 2110/0066 (2021.01); C08J 2203/06 (2013.01); C08J 2203/08 (2013.01); C08J 2203/14 (2013.01); C08J 2203/142 (2013.01); C08J 2203/16 (2013.01); C08J 2203/162 (2013.01); C08J 2371/02 (2013.01); C08J 2377/00 (2013.01); C08J 2377/06 (2013.01); C08J 2423/08 (2013.01); C08J 2431/04 (2013.01); C08J 2433/00 (2013.01); C08J 2433/08 (2013.01); C08J 2433/10 (2013.01)

(58) Field of Classification Search
None
See application file for complete search history.

(56) References Cited

U.S. PATENT DOCUMENTS

| 4,331,786 A | * | 5/1982 | Foy | C08G 69/44 525/408 |
| 4,820,796 A | * | 4/1989 | Suzuki | C08G 69/44 525/420 |
| 4,984,376 A | * | 1/1991 | Walter | A43B 13/141 36/30 R |
| 2016/0185088 A1† | | 6/2016 | Akatsu | |
| 2017/0283555 A1† | | 10/2017 | Takano | |

FOREIGN PATENT DOCUMENTS

| EP | 0402883 A2 | 12/1990 |
| EP | 0405227 A2 | 1/1991 |
| EP | 0459862 A1 | 12/1991 |
| EP | 1650255 A1 | 4/2006 |
| JP | 03-97404 A | 4/1991 |
| JP | 2008/0517122 A | 5/2008 |
| WO | 2013148841 A2 | 10/2013 |
| WO | 2015052265 A1 | 4/2015 |
| WO | 2017129913 A1 | 8/2017 |

OTHER PUBLICATIONS

Lubrizol Hardness Scales, 2012 (Year: 2012).*
Toughening, Swallowe, G. M. "Mechanical Properties and Testing of Polymers", p. 257,1999. (Year: 1999).*
International Search Report for International Application No. PCT/FR2017050187, entitled "Copolymer Foam With Polyamide Blocks and Polyether Blocks", dated Mar. 27, 2017.
Kun Lin, "Development of High Strength Microcellular Foams Using Polyether Block Amide", 66 pp, M.Eng. Sep. 15, 2010, Dept. of Mechnical & Industrial Enginerring, University of Toronto.
Written Opinion for International Application No. PCT/FR2017050187, entitled "Copolymer Foam With Polyamide Blocks and Polyether Blocks", dated Mar. 8, 2017.
Sean Arsenault, New technological developments with PEBAX®, 775-788, 2008, Technical Papers, Regional Technical Conference, the Annual Technical Conference for Plastics Professionals (ANTEC).†

* cited by examiner
† cited by third party

Primary Examiner — Christopher M Rodd
(74) Attorney, Agent, or Firm — Hamilton, Brook, Smith & Reynolds, P.C.

(57) ABSTRACT

The invention relates to a non-cross-linked copolymer foam with polyamide blocks and polyether blocks, wherein: the polyamide blocks of the copolymer have an average molar mass of from 200 to 1,500 g/mol; the polyether blocks of the copolymer have an average molar mass of from 800 to 2,500 g/mol; and the weight ratio of the polyamide blocks to the polyether blocks of the copolymer is from 0.1 to 0.9. The invention also relates to a method for manufacturing said foam and items manufactured from said foam.

18 Claims, 1 Drawing Sheet

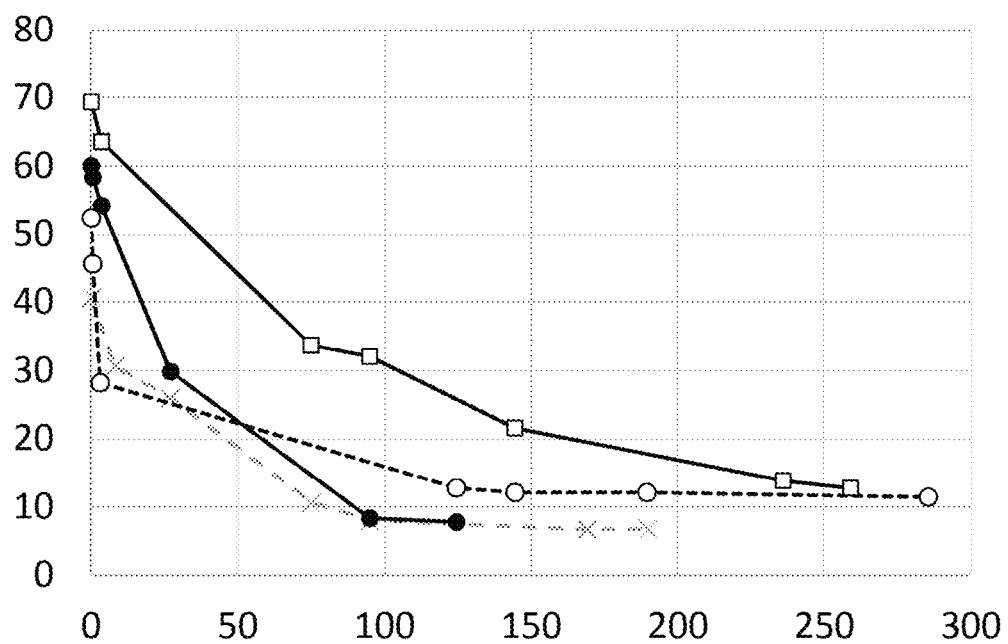

COPOLYMER FOAM WITH POLYAMIDE BLOCKS AND POLYETHER BLOCKS

RELATED APPLICATION(S)

This application is the U.S. National Stage of International Application No. PCT/FR2017/050187, filed Jan. 27, 2017, which designates the U.S., published in French, and claims priority under 35 U.S.C. § 119 or 365(c) to FR Application No. 1650719, filed Jan. 29, 2016. The entire teachings of the above applications are incorporated herein by reference.

SCOPE OF THE INVENTION

The present invention relates to a foam formed from a polyamide polyether block copolymer as well as a method for manufacturing it.

TECHNICAL BACKGROUND

Various polymer foams are used notably in the field of sports equipment, such as soles or sole components, gloves, rackets or golf balls, personal protective elements, in particular for the practice of sport (vests, inner helmet or hull parts . . . ).

Such applications require a set of particular physical properties ensuring an ability to rebound, a low compression set and an ability to withstand repeated impacts without deforming and then returning to the initial shape.

Documents EP 0405227 and EP 0402883 disclose foams manufactured from various polymers and their use in shoe soles.

Document EP 1650255 discloses crosslinked foams obtained from polyamide polyether block copolymers.

Cross-linked foams have the drawback of presenting significant constraints from a point of view of the manufacturing method: the manufacturing time is generally high, the manufacturing is generally necessarily in batch mode only, and undesirable chemical products have to be handled.

In addition, crosslinked foams are difficult to recycle after use.

Document WO 2013/148841 discloses a bi-layer extrusion method from various polymers, including polyamide polyether block copolymers.

Document WO 2015/052265 discloses a method for manufacturing expanded thermoplastic particles from any thermoplastic elastomer polymer.

Furthermore, the company Zotefoams commercializes crosslinked foams manufactured from polyamide polyether block copolymers under the name ZOTEK® PEBA. The disadvantages of crosslinking have been mentioned above. In addition, the durability of the products is imperfect.

There are also many foams manufactured from thermoplastic polyurethane (TPU) or from ethylene-vinyl acetate (EVA). These foams have a relatively restricted operating temperature range, as well as compression set in a relatively short time which is relatively low and an imperfect durability. Their manufacturing methods are also constrictive.

There is thus a need to provide low density polymer foams, having one or more advantageous properties among: a high capacity to give back elastic energy under low constraint stress; a low compression set; and a high resistance to compressive fatigue.

SUMMARY OF THE INVENTION

The invention relates first of all to a foam of non-crosslinked polyamide polyether block copolymer, wherein:

the polyamide blocks of the copolymer have a number average molecular weight from 200 to 1500 g/mol;

the polyether blocks of the copolymer have a number average molecular weight from 800 to 2500 g/mol; and the mass ratio of the polyamide blocks relative to the polyether blocks of the copolymer is from 0.1 to 0.9.

ACCORDING TO ONE EMBODIMENT the polyamide blocks of the copolymer have a number average molecular weight of from 400 to 1000 g/mol, preferably from 600 to 850 g/mol;

the polyether blocks of the copolymer have a number average molecular weight from 1000 to 2000 g/mol; and the mass ratio of the polyamide blocks relative to the polyether blocks of the copolymer is from 0.3 to 0.6.

According to one embodiment, the polyamide blocks of the copolymer are blocks of polyamide 11, or of polyamide 12, or of polyamide 6, or of polyamide 6.10.

According to one embodiment, the polyether blocks of the copolymer are blocks of polyethylene glycol or of polytetrahydrofuran.

According to one embodiment, the foam has a density of less than or equal to 800 kg/m$^3$, preferably less than or equal to 600 kg/m$^3$, more particularly preferably less than or equal to 400 kg/m$^3$, or even less than or equal to 300 kg/m$^3$.

According to one embodiment, the foam also contains one or more additives, preferably chosen among copolymers of ethylene and vinyl acetate, copolymers of ethylene and of acrylate, and copolymers of ethylene and of alkyl(meth) acrylate.

The invention also relates to a method for manufacturing this foam, comprising a step of mixing the copolymer in the molten state, optionally with one or more additives, and with an expansion agent, and a step of foaming the mixture of copolymer and expansion agent.

In one embodiment, the expansion agent is a physical expansion agent, preferably selected from dinitrogen, carbon dioxide, hydrocarbons, chlorofluorocarbons, hydrochlorocarbons, hydrofluorocarbons and hydrochlorofluorocarbons.

According to one embodiment, the method comprises a step of injecting the mixture of copolymer and expansion agent into a mold, wherein the foaming of the mixture is carried out by the opening of the mold.

The invention also relates to an article consisting of the above foam.

The invention also relates to an article comprising at least one element consisting of the above foam.

According to one embodiment, the article of the invention is chosen among soles of sports shoes, balls, gloves, personal protective equipment, pads for rails, automobile parts, construction parts. and parts of electrical and electronic equipment.

The present invention makes it possible to overcome the disadvantages of the prior art. It provides, more particularly, low density polymer foams, having one or more advantageous properties among: a high capacity to give back elastic energy under low constraint stress; a low compression set; and a high resistance to compressive fatigue.

Advantageously, these properties are obtained over a wide temperature range, preferably from −20° C. to 50° C., or even from −30° C. to 80° C.

This is accomplished through the use of a non-crosslinked polyamide polyether block copolymer, characterized by particular ranges of molecular weight for the polyamide blocks and the polyether blocks, as well as a particular range of mass ratio between the polyamide blocks and the polyether blocks.

BRIEF DESCRIPTION OF THE FIGURE

FIG. 1 shows the results of measurements of compression set after a fatigue test carried out on a foam according to the invention and on a control foam (see example 2). The relaxation time (in hours) is shown on the abscissa, and the percentage of residual deformation is indicated on the ordinate.

DESCRIPTION OF EMBODIMENTS OF THE INVENTION

The invention will now be described in more detail and without limitation in the description which follows.

The invention uses a copolymer of polyamide blocks and of polyether blocks, or "PEBA".

PEBAs result from the polycondensation of polyamide blocks with reactive ends with polyether blocks with reactive ends, such as, among others, the polycondensation:

1) of polyamide blocks with diamine chain ends with polyoxyalkylene blocks with dicarboxylic chain ends;

2) of polyamide blocks with dicarboxylic chain ends with polyoxyalkylene blocks with diamine chain ends, obtained, for example, by cyanoethylation and hydrogenation of aliphatic polyoxyalkylene α,ω-dihydroxylated blocks called polyetherdiols;

3) of polyamide blocks with dicarboxylic chain ends with polyetherdiols, the products obtained being, in this particular case, polyetheresteramides.

The polyamide blocks with dicarboxylic chain ends come, for example, from the condensation of polyamide precursors in the presence of a dicarboxylic acid chain limiter. The polyamide blocks with diamine chain ends come, for example, from the condensation of polyamide precursors in the presence of a diamine chain limiter.

Three types of polyamide blocks may advantageously be used.

According to a first type, the polyamide blocks come from the condensation of a dicarboxylic acid, in particular those having from 4 to 20 carbon atoms, preferably those having from 6 to 18 carbon atoms, and an aliphatic or aromatic diamine, in particular those having from 2 to 20 carbon atoms, preferably those having from 6 to 14 carbon atoms.

As examples of dicarboxylic acids mention may be made of 1,4-cyclohexyldicarboxylic acid, butanedioic, adipic, azelaic, suberic, sebacic, dodecanedicarboxylic, octadecanedicarboxylic and terephthalic and isophthalic acids, but also dimerized fatty acids.

As examples of diamines, mention may be made of tetramethylenediamine, hexamethylenediamine, 1,10-decamethylene-diamine, dodecamethylenediamine, trimethylhexamethylenediamine and isomers. bis-(4-aminocyclohexyl)-methane (BACM), bis(3-methyl-4-aminocyclohexyl) methane (BMACM), and 2-2-bis(3-methyl-4-aminocyclohexyl) propane (BMACP), para-amino-di-cyclohexylmethane (PACM), isophoronediamine (IPDA), 2,6-bis(aminomethyl)-norbornane (BAMN) and piperazine (PIP).

Advantageously, polyamide blocks PA 4.12, PA 4.14, PA 4.18, PA 6.10, PA 6.12, PA 6.14, PA 6.18, PA 9.12, PA 10.10, PA 10.12, PA 10.14 and PA 10.18 are used. In the notation PA X.Y, X represents the number of carbon atoms derived from the diamine residues, and Y represents the number of carbon atoms derived from the diacid residues in a conventional manner.

According to a second type, the polyamide blocks result from the condensation of one or more α,ω-aminocarboxylic acids and/or of one or more lactams having from 6 to 12 carbon atoms in the presence of a dicarboxylic acid having from 4 to 12 carbon atoms or a diamine. As examples of lactams, mention may be made of caprolactam, oenantholactam and lauryllactam. As examples of α,ω-amino carboxylic acid, mention may be made of aminocaproic, amino-7-heptanoic, amino-11-undecanoic and amino-12-dodecanoic acids.

Advantageously, the polyamide blocks of the second type are blocks of PA 11 (polyundecanamide), of PA 12 (polydodecanamide) or of PA 6 (polycaprolactam). In the notation PA X, X represents the number of carbon atoms derived from the amino acid residues.

According to a third type, the polyamide blocks result from the condensation of at least one α,ω-aminocarboxylic acid (or a lactam), at least one diamine and at least one dicarboxylic acid.

In this case, the polyamide PA blocks are prepared by polycondensation:

of the linear or aromatic aliphatic diamine or diamines having X carbon atoms;

of the dicarboxylic acid or acids having Y carbon atoms; and of the comonomer or comonomers {Z} chosen among lactams and α,ω-aminocarboxylic acids having Z carbon atoms and equimolar mixtures of at least one diamine having X1 carbon atoms, and at least one dicarboxylic acid having Y1 carbon atoms, wherein (X1, Y1) is different from (X, Y), said comonomer or comonomers {Z} being introduced in a weight proportion advantageously ranging up to 50%, preferably up to 20%, and even more advantageously up to 10% relative to all of the polyamide precursor monomers;

in the presence of a chain limiter chosen from dicarboxylic acids.

Advantageously, the dicarboxylic acid having Y carbon atoms, which is introduced in excess relative to the stoichiometry of the diamine or diamines, is used as chain limiter.

According to a variant of this third type, the polyamide blocks result from the condensation of at least two α,ω-aminocarboxylic acids or of at least two lactams having from 6 to 12 carbon atoms or of a lactam and a aminocarboxylic acid not having the same number of carbon atoms in the possible presence of a chain limiter. As examples of aliphatic α,ω-aminocarboxylic acid mention may be made of aminocaproic, amino-7-heptanoic, amino-11-undecanoic and amino-12-dodecanoic acids. As examples of lactam, mention may be made of caprolactam, oenantholactam and lauryllactam. As examples of aliphatic diamines, mention may be made of hexamethylenediamine, dodecamethylenediamine and trimethylhexamethylenediamine. As examples of cycloaliphatic diacids, mention may be made of 1,4-cyclo-hexyldicarboxylic acid. As examples of aliphatic diacids, mention may be made of butanedioic, adipic, azelaic, suberic, sebacic, dodecanedicarboxylic acid and dimerized fatty acid. These dimerized fatty acids preferably have a dimer content of at least 98%; preferably they are hydrogenated; these are, for example, products commercialized under the trademark "PRIPOL" by the company "CRODA", or under the trademark EMPOL by the company BASF, or under the trademark Radiacid by the company OLEON, and polyoxyalkylenes α,ω-diacids. As examples of aromatic diacids, mention may be made of terephthalic (T) and isophthalic acid (I). As examples of cycloaliphatic diamines, mention may be made of the isomers of bis(4-aminocyclohexyl) methane (BACM), bis(3-methyl-4-aminocyclohexyl) methane (BMACM) and 2-2-bis-(3-methyl-4-aminocyclohexyl) propane (BMACP), and para-amino-di-cyclohexyl methane (PACM). The other diamines commonly used may be isophoronediamine (IPDA), 2,6-bis (aminomethyl)-norbornane (BAMN) and piperazine.

As examples of polyamide blocks of the third type, mention may be made of the following:

PA 6.6/6, where 6.6 denotes hexamethylenediamine units condensed with adipic acid and 6 denotes units resulting from the condensation of caprolactam;

PA 6.6/6.10/11/12, where 6.6 denotes hexamethylenediamine condensed with adipic acid, 6.10 denotes hexamethylenediamine condensed with sebacic acid, 11 denotes units resulting from the condensation of aminoundecanoic acid and 12 denotes units resulting from the condensation of lauryllactam.

The notations PA X/Y, PA X/Y/Z, etc. relate to copolyamides in which X, Y, Z, etc. represent homopolyamide units such as described above.

Advantageously, the polyamide blocks of the copolymer used in the invention comprise polyamide blocks PA 6, PA 11, PA 12, PA 5.4, PA 5.9, PA 5.10, PA 5.12, PA 5.13, PA 5.14, PA 5.16, PA 5.18, PA 5.36, PA 6.4, PA 6.9, PA 6.10, PA 6.12, PA 6.13, PA 6.14, PA 6.16, PA 6.18, PA 6.36, PA 10.4, PA 10.9, PA 10.10, PA 10.12, PA 10.13, PA 10.14, PA 10.16, PA 10.18, PA 10.36, PA 10.T, PA 12.4, PA 12.9, PA 12.10, PA 12.12, PA 12.13, PA 12.14, PA 12.16, PA 12.18, PA 12.36, PA 12.T, or mixtures or copolymers thereof; and preferably comprise polyamide blocks PA 6, PA 11, PA 12, PA 6.10, PA 10.10, PA 10.12, or mixtures or copolymers thereof.

The polyether blocks consist of alkylene oxide units.

The polyether blocks may, notably, be PEG (polyethylene glycol) blocks, i.e. consisting of ethylene oxide units, and/or PPG (propylene glycol) blocks, i.e. consisting of propylene oxide units, and/or PO3G (polytrimethylene glycol) blocks, i.e. consisting of glycol polytri-methylene ether units, and/or PTMG blocks, i.e. consisting of tetramethylene glycol units also called polytetrahydrofuran units. The PEBA copolymers may comprise in their chain several types of polyethers, wherein the copolyethers may be blocks or statistical.

It is also possible to use blocks obtained by oxyethylation of bisphenols, such as, for example, bisphenol A. These latter products are described notably in document EP 613919.

The polyether blocks may also consist of ethoxylated primary amines. As examples of ethoxylated primary amines, mention may be made of the products of formula:

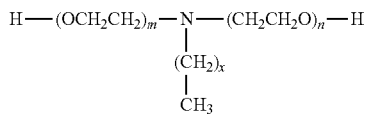

wherein, m and n are integers comprised between 1 and 20 and x is an integer comprised between 8 and 18. These products are for example commercially available under the trademark NORAMOX® from the company CECA and under the trademark GENAMIN® from the company CLARIANT.

The flexible polyether blocks may comprise polyoxyalkylene blocks with NH$_2$ chain ends, wherein such blocks can be obtained by cyanoacetylation of aliphatic α,ω-dihydroxylated polyoxyalkylene blocks called polyetherdiols. More particularly, Jeffamine or Elastamine commercial products may be used (e.g. Jeffamine® D400, D2000, ED 2003, XTJ 542, Huntsman's commercial products, also described in documents JP 2004346274, JP 2004352794 and EP 1482011).

The polyetherdiol blocks are either used as such and copolycondensed with polyamide blocks with carboxylic ends, or aminated to be transformed into polyether diamines and condensed with polyamide blocks with carboxylic ends. The general method for the two-step preparation of PEBA copolymers having ester bonds between the PA blocks and the PE blocks is known and is described, for example, in document FR 2846332. The general method for preparing the PEBA copolymers of the invention having amide bonds between the PA blocks and the PE blocks is known and described, for example, in document EP 1482011. The polyether blocks may also be mixed with polyamide precursors and a diacid chain limiter to prepare the polymers with polyamide blocks and polyether blocks having statistically distributed units (one-step method).

Of course, the PEBA designation in the present description of the invention relates as well to PEBAX® commercialized by Arkema, Vestamid® commercialized by Evonik®, Grilamid® commercialized by EMS, Pelestat® PEBA type commercialized by Sanyo or any other PEBA from other suppliers.

If the block copolymers described above generally comprise at least one polyamide block and at least one polyether block, the present invention also covers all copolymer alloys comprising two, three, four (or even more) different blocks selected from those described in the present description, since these blocks comprise at least polyamide and polyether blocks.

For example, the copolymer alloy according to the invention may comprise a block-segmented copolymer comprising three different types of blocks (or "triblock"), which result from the condensation of several of the blocks described above. Said triblock is preferably chosen among copolyetheresteramides and copolyetheramide-urethanes.

Particularly preferred PEBA copolymers in the context of the invention are copolymers comprising blocks of:
PA 11 and PEG;
PA 11 and PTMG;
PA 12 and PEG;
PA12 and PTMG;
PA6.10 and PEG;
PA 6.10 and PTMG;
PA 6 and PEG;
PA 6 and PTMG.

The foam of the invention comprises a PEBA copolymer such as described above, wherein preferably only one such copolymer is used. However, it is possible to use a mixture of two or more than two PEBA copolymers as described above.

According to the invention, the number average molecular weight of the polyamide blocks in the PEBA copolymer is from 200 to 1500 g/mol; the number average molecular weight of the polyether blocks is from 800 to 2500 g/mol; and the mass ratio of the polyamide blocks relative to the polyether blocks of the copolymer is from 0.1 to 0.9.

The number average molecular weight is fixed by the content of chain limiter. It may be calculated according to the relation:

$$M_n = \frac{n_{monomer}}{n_{diacid}} * M.W._{repeating\ unit} + M.W._{diacid}$$

In this formula, $n_{monomer}$ represents the number of moles of monomer, $n_{diacid}$ represents the number of moles of diacid limiter in excess, $MW_{repeating\ unit}$ represents the molecular weight of the repeating unit, and $MW_{diacid}$ represents the molecular weight of diacid in excess.

According to particular embodiments, the copolymers are defined by the following ranges of number average molecular weights Mn:

| | $M_n$ of the polyamide blocks | $M_n$ of the polyether blocks |
|---|---|---|
| N° 1 | 200 to 300 g/mol | 800 to 1 000 g/mol |
| N° 2 | 300 to 400 g/mol | 800 to 1 000 g/mol |
| N° 3 | 400 to 500 g/mol | 800 to 1 000 g/mol |
| N° 4 | 500 to 600 g/mol | 800 to 1 000 g/mol |
| N° 5 | 600 to 700 g/mol | 800 to 1 000 g/mol |
| N° 6 | 700 to 800 g/mol | 800 to 1 000 g/mol |
| N° 7 | 800 to 900 g/mol | 800 to 1 000 g/mol |
| N° 8 | 900 to 1 000 g/mol | 800 to 1 000 g/mol |
| N° 9 | 200 to 300 g/mol | 1 000 to 1 200 g/mol |
| N° 10 | 300 to 400 g/mol | 1 000 to 1 200 g/mol |
| N° 11 | 400 to 500 g/mol | 1 000 to 1 200 g/mol |
| N° 12 | 500 to 600 g/mol | 1 000 to 1 200 g/mol |
| N° 13 | 600 to 700 g/mol | 1 000 to 1 200 g/mol |
| N° 14 | 700 to 800 g/mol | 1 000 to 1 200 g/mol |
| N° 15 | 800 to 900 g/mol | 1 000 to 1 200 g/mol |
| N° 16 | 900 to 1 000 g/mol | 1 000 to 1 200 g/mol |
| N° 17 | 1 000 to 1 100 g/mol | 1 000 to 1 200 g/mol |
| N° 18 | 200 to 300 g/mol | 1 200 to 1 400 g/mol |
| N° 19 | 300 to 400 g/mol | 1 200 to 1 400 g/mol |
| N° 20 | 400 to 500 g/mol | 1 200 to 1 400 g/mol |
| N° 21 | 500 to 600 g/mol | 1 200 to 1 400 g/mol |
| N° 22 | 600 to 700 g/mol | 1 200 to 1 400 g/mol |
| N° 23 | 700 to 800 g/mol | 1 200 to 1 400 g/mol |
| N° 24 | 800 to 900 g/mol | 1 200 to 1 400 g/mol |
| N° 25 | 900 to 1 000 g/mol | 1 200 to 1 400 g/mol |
| N° 26 | 1 000 to 1 100 g/mol | 1 200 to 1 400 g/mol |
| N° 27 | 1 100 to 1 200 g/mol | 1 200 to 1 400 g/mol |
| N° 28 | 1 200 to 1 300 g/mol | 1 200 to 1 400 g/mol |
| N° 29 | 200 to 300 g/mol | 1 400 to 1 600 g/mol |
| N° 30 | 300 to 400 g/mol | 1 400 to 1 600 g/mol |
| N° 31 | 400 to 500 g/mol | 1 400 to 1 600 g/mol |
| N° 32 | 500 to 600 g/mol | 1 400 to 1 600 g/mol |
| N° 33 | 600 to 700 g/mol | 1 400 to 1 600 g/mol |
| N° 34 | 700 to 800 g/mol | 1 400 to 1 600 g/mol |
| N° 35 | 800 to 900 g/mol | 1 400 to 1 600 g/mol |
| N° 36 | 900 to 1 000 g/mol | 1 400 to 1 600 g/mol |
| N° 37 | 1 000 to 1 100 g/mol | 1 400 to 1 600 g/mol |
| N° 38 | 1 100 to 1 200 g/mol | 1 400 to 1 600 g/mol |
| N° 39 | 1 200 to 1 300 g/mol | 1 400 to 1 600 g/mol |
| N° 40 | 1 300 to 1 400 g/mol | 1 400 to 1 600 g/mol |
| N° 41 | 1 400 to 1 500 g/mol | 1 400 to 1 600 g/mol |
| N° 42 | 200 to 300 g/mol | 1 600 to 1 800 g/mol |
| N° 43 | 300 to 400 g/mol | 1 600 to 1 800 g/mol |
| N° 44 | 400 to 500 g/mol | 1 600 to 1 800 g/mol |
| N° 45 | 500 to 600 g/mol | 1 600 to 1 800 g/mol |
| N° 46 | 600 to 700 g/mol | 1 600 to 1 800 g/mol |
| N° 47 | 700 to 800 g/mol | 1 600 to 1 800 g/mol |
| N° 48 | 800 to 900 g/mol | 1 600 to 1 800 g/mol |
| N° 49 | 900 to 1 000 g/mol | 1 600 to 1 800 g/mol |
| N° 50 | 1 000 to 1 100 g/mol | 1 600 to 1 800 g/mol |
| N° 51 | 1 100 to 1 200 g/mol | 1 600 to 1 800 g/mol |
| N° 52 | 1 200 to 1 300 g/mol | 1 600 to 1 800 g/mol |
| N° 53 | 1 300 to 1 400 g/mol | 1 600 to 1 800 g/mol |
| N° 54 | 1 400 to 1 500 g/mol | 1 600 to 1 800 g/mol |
| N° 55 | 200 to 300 g/mol | 1 800 to 2 000 g/mol |
| N° 56 | 300 to 400 g/mol | 1 800 to 2 000 g/mol |
| N° 57 | 400 to 500 g/mol | 1 800 to 2 000 g/mol |
| N° 58 | 500 to 600 g/mol | 1 800 to 2 000 g/mol |
| N° 59 | 600 to 700 g/mol | 1 800 to 2 000 g/mol |
| N° 60 | 700 to 800 g/mol | 1 800 to 2 000 g/mol |
| N° 61 | 800 to 900 g/mol | 1 800 to 2 000 g/mol |
| N° 62 | 900 to 1 000 g/mol | 1 800 to 2 000 g/mol |
| N° 63 | 1 000 to 1 100 g/mol | 1 800 to 2 000 g/mol |
| N° 64 | 1 100 to 1 200 g/mol | 1 800 to 2 000 g/mol |
| N° 65 | 1 200 to 1 300 g/mol | 1 800 to 2 000 g/mol |
| N° 66 | 1 300 to 1 400 g/mol | 1 800 to 2 000 g/mol |
| N° 67 | 1 400 to 1 500 g/mol | 1 800 to 2 000 g/mol |
| N° 68 | 200 to 300 g/mol | 2 000 to 2 200 g/mol |
| N° 69 | 300 to 400 g/mol | 2 000 to 2 200 g/mol |
| N° 70 | 400 to 500 g/mol | 2 000 to 2 200 g/mol |
| N° 71 | 500 to 600 g/mol | 2 000 to 2 200 g/mol |
| N° 72 | 600 to 700 g/mol | 2 000 to 2 200 g/mol |
| N° 73 | 700 to 800 g/mol | 2 000 to 2 200 g/mol |
| N° 74 | 800 to 900 g/mol | 2 000 to 2 200 g/mol |
| N° 75 | 900 to 1 000 g/mol | 2 000 to 2 200 g/mol |
| N° 76 | 1 000 to 1 100 g/mol | 2 000 to 2 200 g/mol |
| N° 77 | 1 100 to 1 200 g/mol | 2 000 to 2 200 g/mol |
| N° 78 | 1 200 to 1 300 g/mol | 2 000 to 2 200 g/mol |
| N° 79 | 1 300 to 1 400 g/mol | 2 000 to 2 200 g/mol |
| N° 80 | 1 400 to 1 500 g/mol | 2 000 to 2 200 g/mol |
| N° 81 | 200 to 300 g/mol | 2 200 to 2 500 g/mol |
| N° 82 | 300 to 400 g/mol | 2 200 to 2 500 g/mol |
| N° 83 | 400 to 500 g/mol | 2 200 to 2 500 g/mol |
| N° 84 | 500 to 600 g/mol | 2 200 to 2 500 g/mol |
| N° 85 | 600 to 700 g/mol | 2 200 to 2 500 g/mol |
| N° 86 | 700 to 800 g/mol | 2 200 to 2 500 g/mol |
| N° 87 | 800 to 900 g/mol | 2 200 to 2 500 g/mol |
| N° 88 | 900 to 1 000 g/mol | 2 200 to 2 500 g/mol |
| N° 89 | 1 000 to 1 100 g/mol | 2 200 to 2 500 g/mol |
| N° 90 | 1 100 to 1 200 g/mol | 2 200 to 2 500 g/mol |
| N° 91 | 1 200 to 1 300 g/mol | 2 200 to 2 500 g/mol |
| N° 92 | 1 300 to 1 400 g/mol | 2 200 to 2 500 g/mol |
| N° 93 | 1 400 to 1 500 g/mol | 2 200 to 2 500 g/mol |

In addition, according to the invention, the mass ratio of the polyamide blocks relative to the polyether blocks of the copolymer is from 0.1 to 0.9. This mass ratio may be calculated by dividing the number average molecular weight of the polyamide blocks by the number average molecular weight of the polyether blocks.

According to particular embodiments, this ratio is from 0.1 to 0.2; or from 0.2 to 0.3; or from 0.3 to 0.4; or from 0.4 to 0.5; or from 0.5 to 0.6; or from 0.6 to 0.7; or from 0.7 to 0.8; or from 0.8 to 0.9.

Preferably, the copolymer used in the invention has an instant hardness of less than or equal to 40 Shore D, more preferably less than or equal to 35 Shore D. The hardness measurements may be carried out according to the ISO 868 standard.

The polyamide polyether block copolymer is used to form a foam, without a crosslinking step. The foam is formed by mixing the copolymer in the molten state with an expansion agent and then performing a foaming step.

According to one embodiment, the foam thus formed consists essentially, or even consists, of the copolymer described above (or the copolymers, if a mixture of copolymers is used) and optionally the expansion agent, if it remains present in the pores of the foam, notably if it is a closed pore foam.

The polyamide polyether block copolymer may be combined with various additives, for example copolymers of ethylene and vinyl acetate or EVA (for example those commercialized under the name Evatane® by Arkema), or copolymers of ethylene and acrylate, or copolymers of ethylene and alkyl(meth)acrylate, for example those commercialized under the name Lotryl® by Arkema. These additives may make it possible to adjust the hardness of the foamed piece, its appearance and its comfort. The additives may be added in a content from 0 to 50% by weight, preferably from 5 to 30% by weight, relative to the polyamide polyether block copolymer.

The expansion agent may be a chemical or physical agent. Preferably, it is a physical agent, such as, for example, dinitrogen or carbon dioxide, or a hydrocarbon, chlorofluorocarbon, hydrochlorocarbon, hydrofluorocarbon or hydrochlorofluorocarbon (saturated or unsaturated). For example, butane or pentane may be used.

A physical expansion agent is mixed with the copolymer in liquid or supercritical form, then converted into a gas phase during the foaming step.

According to a preferred embodiment, the mixture of the copolymer and the expansion agent is injected into a mold, and the foaming is produced by the opening of the mold. This technique makes it possible to directly produce three-dimensional foamed objects having complex geometries.

It is also a relatively simple technique to implement, notably with respect to certain methods for melting foamed particles as described in the prior art: in fact, filling the mold with foamed granules of polymer then melting the particles to ensure mechanical strength of the parts without destroying the structure of the foam, are complex operations.

Other foaming techniques that may be used are notably "batch" foaming and extrusion foaming.

The foam produced according to the invention preferably has a density from 50 to 800 kg/m$^3$, and more preferably from 100 to 600 kg/m$^3$. Density control may be achieved by adapting the parameters of the manufacturing process.

Preferably, this foam has a rebound resilience, according to the ISO 8307 standard, greater than or equal to 55%.

Preferably, this foam has a compression set, according to the ISO 7214 standard, less than or equal to 10%, and more preferably less than or equal to 8%.

Preferably, this foam also has excellent properties of fatigue resistance and damping.

The foam according to the invention may be used to manufacture sports equipment, such as soles of sports shoes, ski boots, midsoles, insoles, or functional components soles, in the form of inserts in different parts of the sole (heel or arch, for example), or even components of the tops of shoes in the form of reinforcements or inserts in the structure of the upper shoe, in the form of protections.

It may also be used to make balls, sports gloves (e.g. football gloves), components of golf balls, rackets, protective elements (vests, inner helmet or hull elements . . . ).

The foam according to the invention has interesting anti-shock, anti-vibration and anti-noise properties, combined with haptic properties adapted to the equipment goods. It may therefore also be used for the manufacture of railway track pads, or various parts in the automobile industry, in transport, in electrical and electronic equipment, in construction or in the manufacturing industry.

An advantage of the foam objects according to the invention is that they may easily be recycled, for example by melting them in an extruder equipped with a degassing outlet (optionally after having cut them into pieces).

EXAMPLES

The following examples illustrate the invention without limiting it.

Example 1

Different PEBA copolymers were tested, the characteristics of which are summarized in the table below:

| PEBA No. | A | B | C | D | E | F |
|---|---|---|---|---|---|---|
| Tf (in ° C.) | 144 | 135 | 150 | 142 | 160 | 147 |
| Tc (in ° C.) | 61 | 63 | 75 | 71 | 88 | 80 |
| Instant hardness (in Shore D) | 33 | 32 | 33 | 32 | 42 | 46 |
| Hardness at 15 s (in Shore D) | 25 | 25 | — | — | 35 | 41 |
| Nature of PA blocks | PA 12 | PA 11 | PA 12 | PA 11 | PA 12 | PA 12 |
| Mass ratio of PA blocks/PE blocks | 0.4 | 0.6 | 0.4 | 0.6 | 1 | 1 |
| $M_n$ PA blocks (in g/mol) | 850 | 600 | 850 | 600 | 2000 | 1000 |
| $M_n$ PE blocks (in g/mol) | 2000 | 1000 | 2000 | 1000 | 2000 | 1000 |

Tf denotes the melting temperature of the copolymer, and Tc denotes its crystallization temperature. The polyether blocks are PTMG blocks for all these copolymers.

The copolymers A to D are according to the invention, and the copolymers E and F correspond to comparative examples.

Foams are made from copolymers A to F by means of an Arburg Allrounder 270C injection press, with a Trexel series II type physical expansion agent injection system. The operating parameters are the following:
  Sheath temperature: 160 to 210° C.
  Injection speed: 112 cm/s.
  Hold time before opening the mold: 25 to 40 s.
  Cooling time: 120 to 180 s.
  Mold temperature: 60 to 80° C.
  Mold opening length: up to 12 mm.
  Opening speed of the mold. 50 mm/s.
  Total cycle time: 145 to 220 s.

The foaming agent used is dinitrogen introduced up to 0.6% by weight.

A thermoplastic polyurethane foam of the Infinergy brand (BASF) and a cross-linked EVA foam are also used as controls.

Various properties of the foams obtained are evaluated:
  density: according to the ISO 845 standard;
  rebound resilience: according to the ISO 8307 standard (a steel ball of 16.8 g and diameter 16 mm is dropped from a height of 500 mm on a foam sample, the rebound resilience thus corresponds to the percentage of energy returned to the ball, or a percentage of the initial height reached by the ball at rebound);
  compression set: a measurement is carried out consisting of compressing a sample at a deformation rate and for a given time, then releasing the released constraint, and noting the residual deformation after a recovery time; the measurement is adapted from the ISO 7214 standard, with a deformation of 50%, a hold time of 22 h, a temperature of 23° C., and by carrying out a measurement after 30 min and another measurement after 24 h of recovery.

| Polymer | Density (kg/m$^3$) | Rebound resilience (%) | CS at 30 min (%) | CS at 24 h (%) |
|---|---|---|---|---|
| PEBA N°A | 200 | 61.5 | | 4.5 |
| PEBA N°C | 220 | 64 | | 2.5 |
| PEBA N°B | 200 | 65 | 7.5 | 4.5 |
| PEBA N°B | 300 | 66 | 8 | 5 |
| PEBA N°B | 400 | 61 | 6 | 5 |
| PEBA N°D | 220 | 63 | | 4 |

-continued

| Polymer | Density (kg/m³) | Rebound resilience (%) | CS at 30 min (%) | CS at 24 h (%) |
|---|---|---|---|---|
| PEBA N°E | 280 | 51 | | 5 |
| PEBA N°F | 240 | 54 | | 4.5 |
| TPU | 140 | 63 | 18 | 1 |
| EVA | 160 | 34 | 24 | |

Example 2

In this example, a compressive fatigue test is carried out on the foam manufactured with PEBA No. B at 200 kg/m³ and on a control TPU foam.

The fatigue test is carried out at a frequency of 1.5 Hz on a sample of 50 mm diameter and about 15 mm thick. A constraint is applied which varies according to a sinusoidal signal between 0 and 360 kPa or between 0 and 720 kPa, by means of a hydraulic dynamometer (MTS810).

After 350,000 cycles, the evolution of the thickness of the sample, which returns to its initial shape over time, is measured. An ideal material would return instantly to its initial shape. The foams currently used have a residual deformation of the order of 10% after several days of relaxation.

This fatigue test reproduces well the mechanical stresses to which a foam sample is subjected, in particular in applications such as the soles of sports shoes.

The results are shown in FIG. 1. The curve marked with white squares corresponds to the control foam tested at 720 kPa. The curve marked with the white circles corresponds to the foam according to the invention tested at 720 kPa. The curve marked with the black circles corresponds to the control foam tested at 360 kPa. The curve marked with the gray crosses corresponds to the foam according to the invention tested at 360 kPa.

It is found that the foam according to the invention returns to its initial shape (minimum residual deformation level) more rapidly than the control foam.

What is claimed is:

1. A non-crosslinked polyamide polyether block copolymer foam, comprising:
    polyamide blocks having a number average molecular weight of from 200 to 1500 g/mol; and
    polyether blocks having a number average molecular weight of from 800 to 2500 g/mol,
    wherein a mass ratio of the polyamide blocks relative to the polyether blocks of the copolymer is from 0.1 to 0.9, and
    wherein the foam has a rebound resilience greater than or equal to 55%.

2. The foam of claim 1, wherein:
    the polyamide blocks have a number average molecular weight of from 400 to 1000 g/mol; and
    the polyether blocks have a number average molecular weight of from 1000 to 2000 g/mol,
    wherein the mass ratio of the polyamide blocks relative to the polyether blocks of the copolymer is from 0.3 to 0.6.

3. The foam of claim 1, wherein:
    the polyamide blocks have a number average molecular weight of from 600 to 850 g/mol; and
    the polyether blocks have a number average molecular weight of from 1000 to 2000 g/mol,
    wherein the mass ratio of the polyamide blocks relative to the polyether blocks of the copolymer is from 0.3 to 0.6.

4. The foam of claim 1, wherein the polyamide blocks of the copolymer include at least one member selected from the group consisting of polyamide 6, polyamide 11, polyamide 12, polyamide 6.10, polyamide 10.10, and polyamide 10.12.

5. The foam of claim 2, wherein the polyamide blocks of the copolymer include at least one member selected from the group consisting of polyamide 6, polyamide 11, polyamide 12, and polyamide 6.10.

6. The foam of claim 1, wherein the polyether blocks of the copolymer include blocks of polyethylene glycol.

7. The foam of claim 1, wherein the polyether blocks of the copolymer include blocks of polytetrahydrofuran.

8. The foam of claim 1, wherein the foam has a density less than or equal to 800 kg/m³.

9. The foam of claim 1, wherein the foam has a density less than or equal to 600 kg/m³.

10. The foam of claim 1, wherein the foam has a density less than or equal to 400 kg/m³.

11. The foam of claim 1, wherein the foam has a density less than or equal to 300 kg/m³.

12. The foam of claim 1, further including at least one additive, selected from the group consisting of a copolymer of ethylene and vinyl acetate, a copolymer of ethylene and acrylate, and a copolymer of ethylene and of alkyl(meth) acrylate.

13. A method for manufacturing a foam of non-crosslinked polyamide polyether block copolymer, comprising:
    a) mixing the copolymer in the molten state with an expansion agent, the copolymer including
    polyamide blocks having a number average molecular weight of from 200 to 1500 g/mol; and
    polyether blocks having a number average molecular weight of from 800 to 2500 g/mol, wherein a mass ratio of the polyamide blocks relative to the polyether blocks of the copolymer is from 0.1 to 0.9;
    b) injecting the mixture of copolymer and expansion agent into a mold; and
    c) foaming the copolymer and expansion agent mixture.

14. A method for manufacturing a foam of non-crosslinked polyamide polyether block copolymer according to claim 13, further comprising adding and mixing at least one additive with the molten copolymer and the expansion agent and foaming the copolymer, expansion agent, and additive mixture.

15. The method of claim 13, wherein the expansion agent is at least one physical expansion agent selected from the group consisting of dinitrogen, carbon dioxide, hydrocarbons, chlorofluorocarbons, hydrochlorocarbon, hydrofluorocarbons and hydrochlorofluorocarbons.

16. The method of claim 13, comprising foaming the mixture by opening the mold.

17. An article that includes a foam, the foam comprising:
    polyamide blocks having a number average molecular weight of from 200 to 1500 g/mol; and
    polyether blocks having a number average molecular weight of from 800 to 2500 g/mol, wherein a mass ratio of the polyamide blocks relative to the polyether blocks of the copolymer is from 0.1 to 0.9; and
    wherein the foam has a rebound resilience greater than or equal to 55%.

18. The article according to claim 17, wherein the article is selected from the group consisting of a sole of a sport shoe, a ball, a glove, a personal protective article, a pad for a rail, an automobile part, a construction part, and electrical and electronic equipment parts.

\* \* \* \* \*

UNITED STATES PATENT AND TRADEMARK OFFICE
CERTIFICATE OF CORRECTION

PATENT NO. : 11,008,464 B2
APPLICATION NO. : 16/071351
DATED : May 18, 2021
INVENTOR(S) : Clio Cocquet et al.

Page 1 of 1

It is certified that error appears in the above-identified patent and that said Letters Patent is hereby corrected as shown below:

In the Claims

In Column 12, Claim 15, Line 52, delete "hydrochlorocarbon" and insert -- hydrochlorocarbons --

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*